United States Patent [19]

Suck

[11] Patent Number: 5,172,037
[45] Date of Patent: Dec. 15, 1992

[54] SWITCHING CIRCUIT FOR DC MOTOR

[76] Inventor: Yoon-Gi Suck, Shinbanpo 7th Apartment 301-608, 130-17, Chamwon-Dong Seocho-Ku, Seoul, Rep. of Korea

[21] Appl. No.: 691,748

[22] Filed: Apr. 26, 1991

[30] Foreign Application Priority Data

May 16, 1990 [KR] Rep. of Korea .................. 90-6656

[51] Int. Cl.$^5$ ............................................. H02P 1/22
[52] U.S. Cl. .................... 318/293; 318/266; 318/286; 318/466
[58] Field of Search ............... 318/264, 265, 266, 283, 318/286, 293, 466, 467, 468, 469, 470, 434

[56] References Cited

U.S. PATENT DOCUMENTS

| | | | |
|---|---|---|---|
| 4,279,490 | 7/1981 | Mashimo et al. | 318/216 X |
| 4,481,452 | 11/1984 | Kitano et al. | 318/293 X |
| 4,562,387 | 12/1985 | Lehnhoff | 318/265 X |
| 4,800,324 | 1/1989 | Kuttner | 318/293 |
| 4,899,063 | 2/1990 | Suck | 318/293 X |
| 4,983,896 | 1/1991 | Sugiyama et al. | 318/286 |

Primary Examiner—Bentsu Ro
Attorney, Agent, or Firm—Lawrence M. Nawrocki

[57] ABSTRACT

A dc motor switching circuit is disclosed, and the circuit includes: a forward revolution switching circuit section 1; a reverse revolution switching circuit section 2; a constant voltage section 3; a switching circuit section 4; an automatic circuit section 5; a manual circuit section 6; a resetting circuit section 7; and upper and lower limit detecting sections 8a, 8b. The dc motor switching circuit of the present invention can be applied to the power window switch of an automobile in a simple manner. Even in the case where upper and lower limits are set up as in a closing/opening device of a garage shutter, a universal application is possible. In all such cases, its constitution is simple, and the circuit is capable of preventing any undesirable result (such as degradation, burning and the like). Further, the automatic and manual operations can be carrier out in a convenient manner.

2 Claims, 4 Drawing Sheets

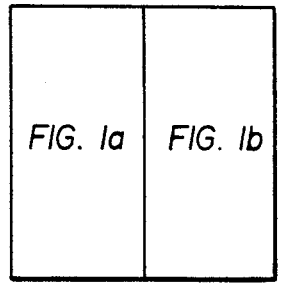
Fig. 1
Fig. 1a
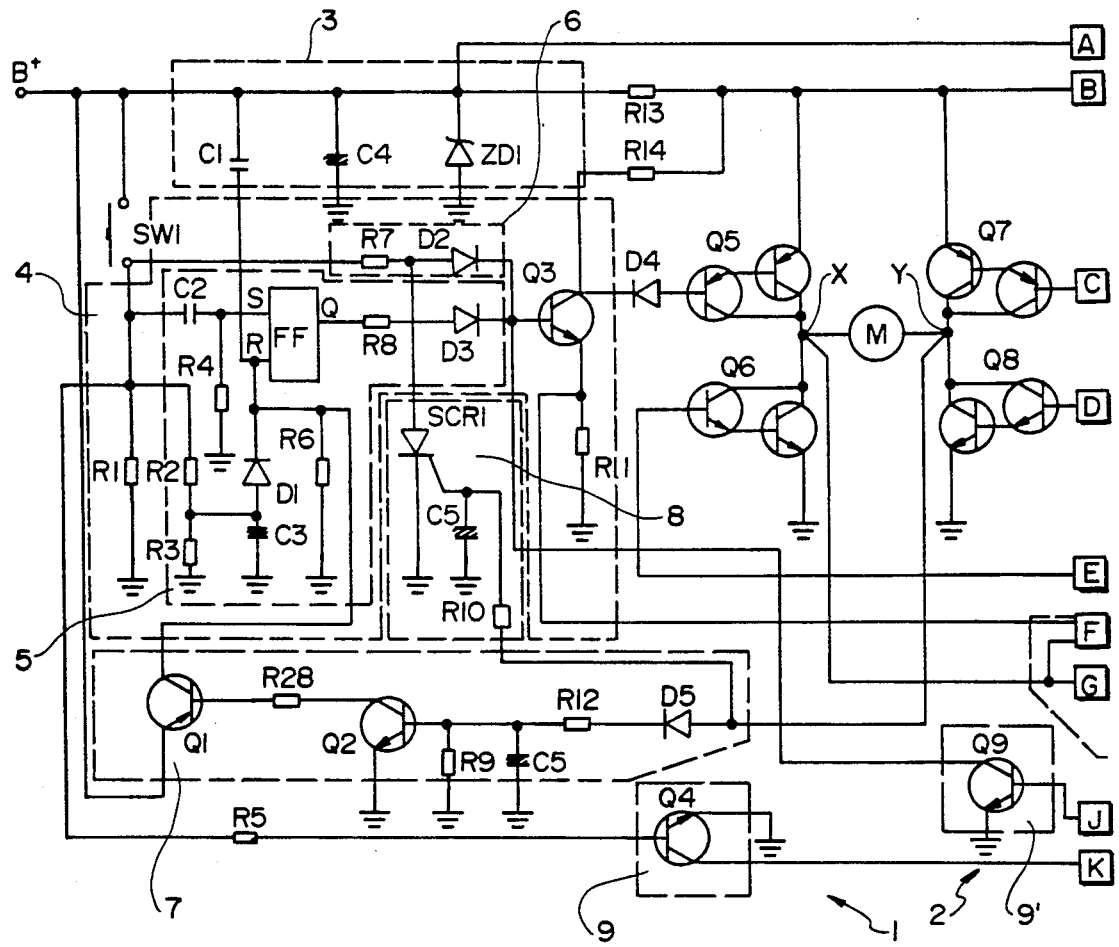

SWITCHING CIRCUIT FOR DC MOTOR

FIELD OF THE INVENTION

The present invention relates to a switching circuit for dc motor, and particularly to a dc motor switching circuit in which the forward and reverse revolutions of the dc motor are switched by one-touch activation in a manner suitable for the power window switch of an automobile; the driving power source for the dc motor is automatically resetted upon arriving of the dc motor at a limit of the revolution driving so as for the degradation of the driving transistor to be prevented; the dc motor can be driven only as much as required by a sustained repeated manual touch activation; and an upper and lower limit detecting section grounds the driving power source upon arriving of the limit point of the revolution driving, thereby protecting the switching circuit of the dc motor during the stopping of the dc motor, and making it easy to operate the dc motor either manually or automatically.

BACKGROUND OF THE INVENTION

Generally, in switching the forward and reverse revolutions of a dc motor, a comparator is used as a means for turning-on or off a driving transistor which is point-symmetrically driven. Or a solenoid is used in order to support a switch knob, and many other devices are proposed. However, all of these devices have problems in driving the dc motor automatically within the upper and lower limits, and in driving the dc motor properly for the respective levels.

Meanwhile, U.S. Pat. No. 4,899,063 which is filed by and granted to the present applicant has the following disadvantage. That is, if the dc motor reaches the upper or lower limit mechanically so as for the dc motor to be no more driven, the point-symmetrically driven transistors Q3-Q6 which are driven by the switchings of transistors Q1 and Q2 are subjected to degradations, or even led to damages. Therefore, there is the disadvantage that the user has to give an attention whenever the switching is terminated.

SUMMARY OF THE INVENTION

The present invention is intended to overcome the above described disadvantages of the conventional circuits.

Therefore it is a first object of the present invention to provide a switching circuit for dc motor, in which the dc motor is driven up to the driving limit automatically through the realization of a one-touch activation, and an automatic resetting is done upon reaching the driving limit.

It is a second object of the present invention to provide a switching circuit for dc motor, in which the driving of the dc motor can be stopped at the desired angular position by performing a continuous one-touch activation, and the driving of the dc motor can be automatically blocked by grounding the switching power source upon reaching the limit.

It is a third object of the present invention to provide a switching circuit for dc motor, in which any damage to the peripheral circuits can be prevented even when the dc motor has arrived at the driving limit, or when a disorder such as a short circuit occurs.

BRIEF DESCRIPTION OF THE DRAWINGS

The above object and other advantages of the present invention will become more apparent by describing in detail the preferred embodiment of the present invention with reference to the attached drawings in which:

FIG. 1 shows the connection of FIGS. 1a and 1b.

FIGS. 1a and 1b show a circuital illustration of the dc motor switching circuit according to the present invention;

DESCRIPTION OF THE PREFERRED EMBODIMENT

Figure 1B:
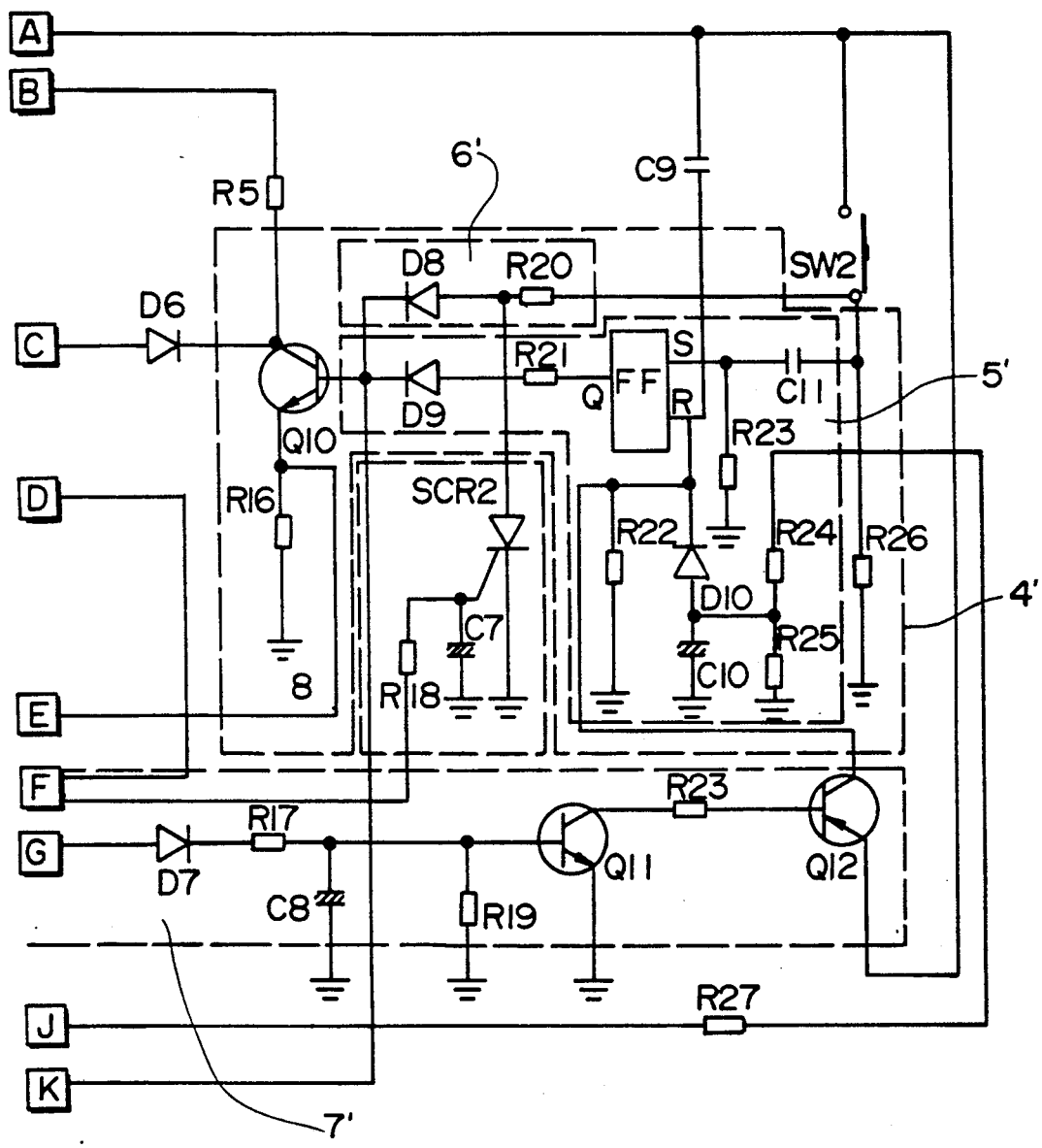

As shown in FIG. 1, a dc motor M as a load is connected to intermediate points X,Y of point-symmetrically driven transistors Q5-Q8; and a constant voltage section 3 consisting of condensers C1, C4 and a constant voltage diode ZD1 is provided in such a manner that it should be able to supply a constant voltage to the dc motor M. A switching circuit section 4 is connected through a forward revolution switch SW1 to the positive (B+) terminal of the constant voltage section 3, and this switching circuit section 4 includes an automatic circuit section 5 and a manual circuit section 6, as well as other elements.

The automatic circuit section 5 includes an R,S flip-flops F,F which are driven in accordance with a condenser C2 and a condenser C3, and which are provided with setting and resetting input terminals. The output terminals of the R,S flip-flops F,F are connected to the base of a switching transistor Q3.

The manual circuit section 6 includes a resistance R7 and a diode D2 which are connected in the forward direction from the forward revolution switch SW1. The manual circuit section 6 is connected through the base of the switching transistor Q3 to the automatic circuit section 5. The base of the driving transistor Q5 is connected to the output terminal of the switching transistor Q3, while the point-symmetrically operated driving transistor Q8 is connected to the emitter of the switching transistor Q3, thereby forming a closed circuit.

A resetting section 7 is for supplying automatic resetting signals to the resetting terminals of the R,S flip-flops F,F of the automatic circuit section 5 from the intermediate point Y. The bases of reverse polar darlington-connected transistors Q1, Q3 of the resetting section 7 are connected through a resistance R12 and a diode D5 to the intermediate point Y. The input terminal of the transistor Q1 is connected to a positive terminal B+ of the power line, and the output terminal of the transistor Q1 is connected to the resetting terminals of the R,S flip-flops F,F in a common contact with the diode D1.

The forward terminal of the diode D5 of the resetting section 7 is branched, and one branch of it is connected to an upper limit detecting section 8. The upper limit detecting section 8 is constituted such that the anode of a thyrister SCR1 is connected to the forward terminal of the diode D2 of the manual circuit section 6, and thus, the upper limit detecting section 8 supplies trigger pulses to the gate of the thyristor SCR1 through a resistance R10 and a condenser C5 in accordance with the intermediate point Y. Further, the upper limit detecting section 8 is constituted such that the cathode of the thyristor SCR1 is grounded.

A protecting circuit 9 is constituted such that a transistor Q4 which is biased through the rear terminal of the forward revolution switch SW1 is connected in such a manner that the base potential of a switching transistor Q10 of the reverse revolution switching circuit section 2 should be grounded during an erroneous operation.

In this way, the forward revolution switching circuit section 1 is formed, and the reverse revolution switching circuit section 2 has the same circuital constitution as that of the forward revolution switching circuit section. The connection of them is symmetrically made, and therefore, the description of it will be skipped.

Figure 2:
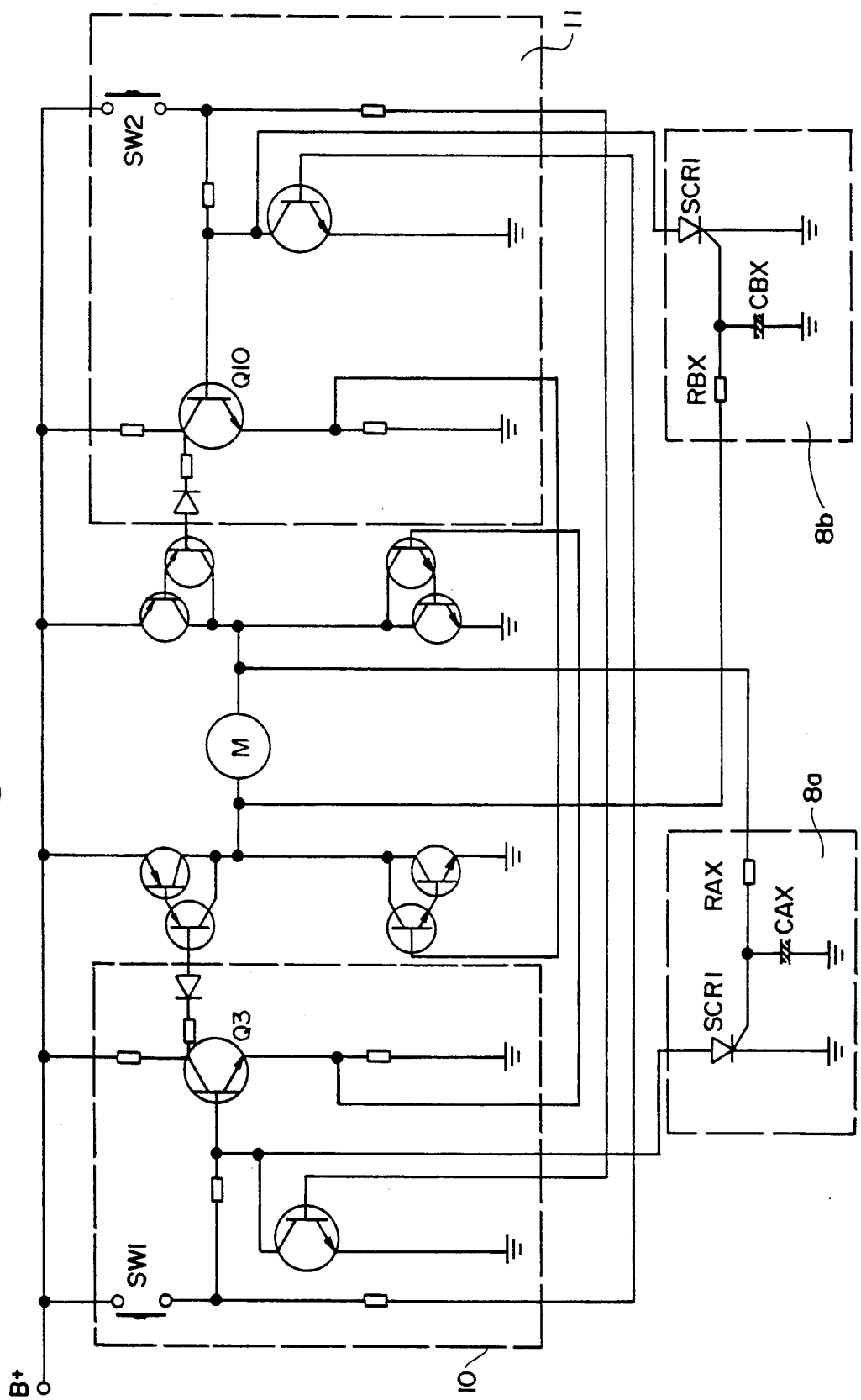
FIG. 2 is a circuital illustration of another embodiment of the present invention.

FIG. 2 illustrates another embodiment of the present invention, and this second embodiment is constituted as described below. The anodes of thyristors SCR1, SCR2 are connected to the bases of the switching transistors Q3, Q10 which are formed in the conventional forward and reverse switching circuit sections 10, 11, while their cathodes are grounded. The gates of the thyristors are connected through condensers CAx, CBx and resistances RAx, RBx to the intermediate points Y,X. Thus there are formed upper and lower limit detecting sections 8a, 8b by which the switching transistors Q3, Q10 can be turned off during the formation of a short circuit or upon arriving of a limit point of the dc motor M. Thus this embodiment is applicable to a manual operation.

The dc motor switching circuit of the present invention constituted as above will now be described as to its operation and effect.

The dc motor M is connected to the intermediate points X,Y of the point-symmetrically driven driving transistors Q5–Q8, and bias circuits are connected to the bases of the switching transistors Q3, Q10, thereby forming the forward revolution switching circuit section 1 and the reverse revolution switching circuit section 2. Thus the device of the present invention is driven through the closing/opening operations of the forward and reverse revolution switches SW1, SW2 which are capable of closing/opening the power line of the anode B+ of the constant voltage section 3.

Now the operation of the circuit will be described focusing attention to the forward revolution switching circuit section 1. If one-touch activation is performed on the forward revolution switch SW1 of the forward revolution switching circuit section 1(that is, if the forward revolution switch SW1 is pressed and released), then a charging current is supplied to the condenser C2 of the switching circuit section 4 in such a manner that an output Q of a high level should be outputted from the setting terminals of the R,S flip-flops F,F. Then this output is supplied through the resistance R8 and the diode D3 to the switching transistor Q3 to act as a bias power source for the transistor Q3. Accordingly, this leads to the interrelated operations of the driving transistors Q5, Q8 to turn on the transistors Q5, Q8, thereby making the dc motor M to perform a forward revolution.

This forward revolution of the dc motor M continues until a resetting input is supplied from the R,S flip-flops.

Under this condition, the condenser C2 of the setting input terminal and the condenser C3 of the resetting input terminal have time constants having a relation C2 C3, so that the resetting input terminal should have a low level state during the initial operation.

Thereafter, if the dc motor M continuously revolves in the forward direction, and if the upper limit arrives due to the limitation of the mechanical properties of the parts so as for the revolution of the motor to be impossible, then the total load resistance of the motor equals to the coil resistance of the motor, with the result that the driving transistors can be degraded by the supplied voltage.

Under this condition, upon stopping of the dc motor M, the transistors Q2, Q1 of the resetting section 7 connected to the intermediate point Y are turned on upon being biased, and consequently, the positive power source B+ is connected to the resetting terminals of the R,S flip-flops F,F. Then, the R,S flip-flops F,F undergo an inversion of state, with the result that the outputs Q of the R,S flip-flops F,F are shifted to a low level, thereby stopping the driving of the dc motor M.

On the other hand, if one-touch activation is performed on the reverse revolution switch SW2 of the reverse revolution switching circuit section 2, then reverse revolutions are performed in the same manner as that of the forward revolutions until the limit (upper or lower limit) arrives, thereupon the dc motor being automatically stopped.

Meanwhile, besides the case where the dc motor M is driven up to the upper or lower limit in the automatical manner, if the driving is to be stopped at a desired position, that is, if a manual operation is to be carried out, the operation is carried out in the manner described below.

Of the time constants of the condenser C3 and the condenser C2 of the automatic circuit section 5, if the time constant of the resistance R2 and the condenser C3 is passed over, the R,S flip-flops F,F undergo an inversion of state, thereby outputting a low level output Q. However, the manual circuit section 6 which is parallelly connected with the automatic circuit section 5 maintains the switching transistor Q3 in a turned-on state, and therefore, the dc motor M can continue in the forward revolutions.

Under this condition, after a proper amount of revolutions, if the dc motor M is to be stopped, then the forward revolution switch SW1 which has been kept pressed has only to be released, so that the switching transistor Q3 should be turned off, and that the dc motor should be stopped.

Meanwhile, if the dc motor M arrives at the upper or lower limit during the above described manual operation, then the load current of the dc motor M flows through the resistance R10 to trigger the gate of the thyristor SCR1. Thus, if the current is supplied to the manual circuit section 6, the driving power is grounded, so that the base of the transistor Q3 is shifted to a low level so as for the switching transistor Q3 to be turned off, thereby blocking the driving power of the dc motor M.

Thus if the dc motor M is stopped during a manual operation, even if the forward revolution switch SW1 is kept pressed on, the driving power is grounded, with the result that any damage or degradation of the circuit components can be prevented.

Here, the condensers C5, C7 perform the role of preventing the triggering of the upper and lower limit detecting sections 8,8' by the initial energizing current of the dc motor M.

Meanwhile, even in the case where only the manual operation circuit of FIG. 2 is provided according to the second embodiment of the present invention, the thyristor SCR is triggered upon stopping of the dc motor, with the result that the bias power source of the switching transistor Q3 is grounded as described above.

Figure 3:
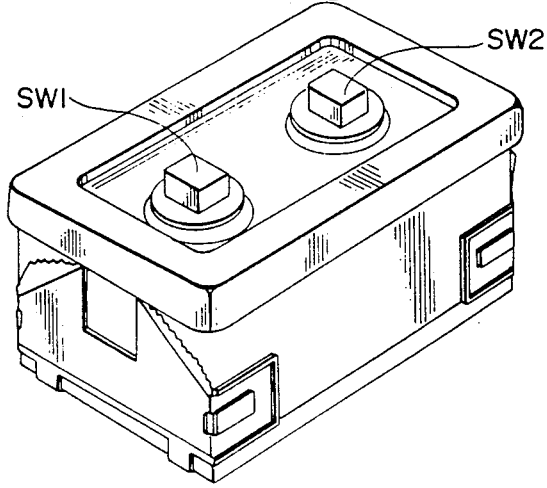
FIG. 3 is a perspective view showing the external appearance of the present invention.
Figure 4:
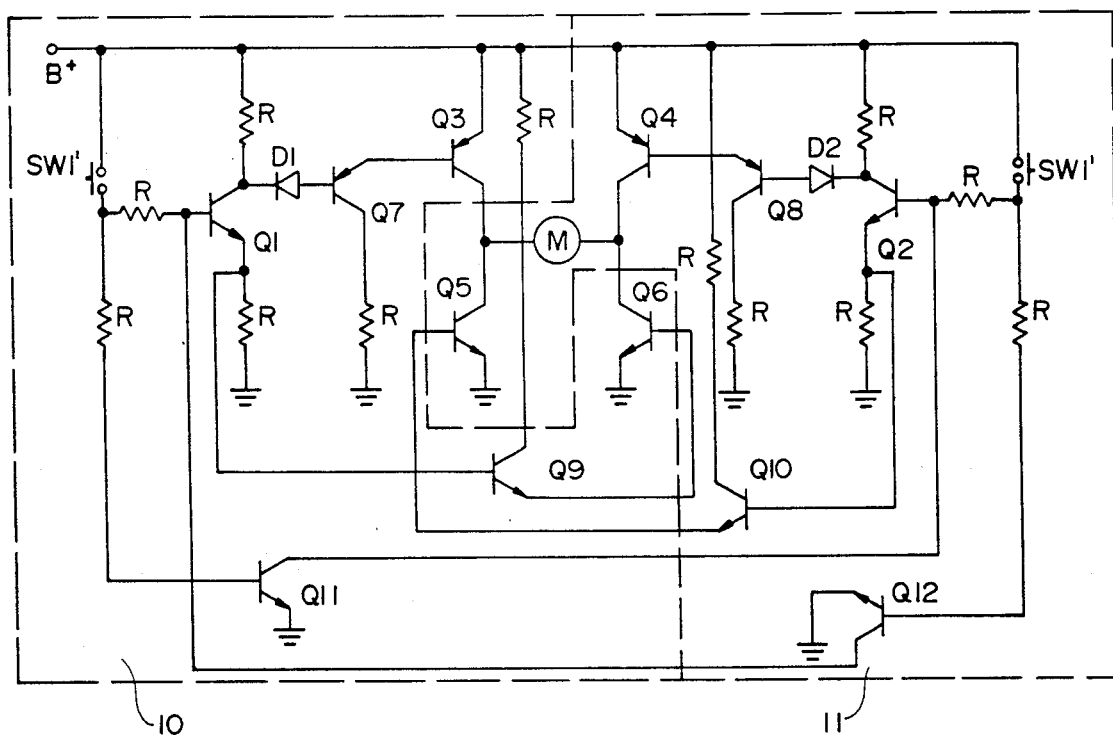
FIG. 4 is a circuital illustration of the conventional switching circuit.

The dc motor switching circuit of the present invention as described above can be applied to the power window switch of an automobile as shown in FIG. 3, in a simple manner. Even in the case where upper and lower limits are set up as in the case of a closing/opening device of the shutter of a garage, a universal application is possible. In all these cases, its constitution is simple, and the circuit is capable of preventing any undesirable result (such as degradation, burning and the like). Further, the automatic and manual operations can be carried out in a convenient manner.

What is claimed is:

1. A dc motor switching circuit comprising: point-symmetrically driven driving transistors Q5-Q8, and a dc motor M connected as a load to intermediate points X,Y of said driving transistors Q5-Q8, characterized in that: a constant voltage section 3 for supplying a constant voltage consists of condensers C1, C4 and a constant voltage diode ZD; a switching circuit section 4 is connected through a forward revolution switch SW1 to a positive terminal B+ of said constant voltage section 3; said switching circuit section includes an automatic circuit section 5 and a manual circuit section 6; said automatic circuit section 5 includes R,S flip-flops F,F provided with setting and resetting input terminals, said R,S flip-flops F,F being driven in accordance with the time constants of a condenser C2 and a condenser C3; the output terminals of said R,S flip-flops F,F are connected to the base of a switching transistor Q3; said manual circuit section 6 includes a resistance R7 and a diode D2 connected in the forward direction from said forward revolution switch SW1; said manual circuit section 6 is connected to the base of said switching transistor Q3 in parallel with said automatic circuit section 5; the base of said driving transistor Q5 is connected to the output terminal of said switching transistor Q3; the base of said point-symmetrically driven driving transistor Q8 is connected to the emitter of said switching transistor Q3 so as for a closed circuit to be formed; a resetting section 7 is provided for supplying automatic reset signals from said intermediate point Y to the resetting terminals of said R,S flip-flops F,F of said automatic circuit section 5; said resetting section 7 includes reverse polar darlington-connected transistors Q1, Q2, the bases of said reverse polar darlington-connected transistors Q1, Q2 are connected through a resistance R12 and a diode D5 to said intermediate point Y; the input terminal of said transistor Q1 is connected to said positive terminal B+ of the constant voltage section; the output terminal of said transistor Q1 is connected to the resetting terminals of said R,S flip-flops F,F in common with a diode D1; the forward terminal of said resetting section 7 is branched to be connected to an upper limit detecting section 8; said upper limit detecting section 8 is connected through the anode of a thyristor SCR1 to the forward terminal of said diode D2 of said manual circuit section 6 in such a manner as to supply trigger pulses through a resistance R10 and a condenser C5 to the gate of said thyristor SCR1 in accordance with the potential of said intermediate point Y; the cathode of said thyristor SCR1 is grounded thereby forming a forward revolution switching circuit section 1; and a similar reverse revolution switching circuit section 2 is provided in asymmetrical form relative to said forward revolution switching circuit section 1.

2. The dc motor switching circuit as claimed in claim 1, wherein the anodes of thyristors SCR1, SCR2 are connected to the bases of said switching transistors Q3, Q10; their cathodes are grounded; their gates are connected through condensers CAX, CBX and resistances RAX,RBX to said intermediate points X,Y; and said switching transistors Q3, Q10 are turned off during a short circuiting or a stopping of said dc motor M upon arriving at a limit state, thereby forming upper and lower limit detecting sections 8a, 8b in the form of a manual operating circuit.

* * * * *